(12) United States Patent
Kaiser et al.

(10) Patent No.: US 7,655,741 B2
(45) Date of Patent: Feb. 2, 2010

(54) THERMOSTABLE VINYLCHLORIDE MIXED POLYMERS

(75) Inventors: Stephan Kaiser, Altötting (DE); Robert Hohenadel, Winhöring (DE); Karl Weber, Unterneukirchen (DE); Franz Zenk, Burgkirchen (DE); Claudia Strohmeier, Geratskrichen (DE)

(73) Assignee: Wacker Chemie AG, Munich (DE)

( * ) Notice: Subject to any disclaimer, the term of this patent is extended or adjusted under 35 U.S.C. 154(b) by 483 days.

(21) Appl. No.: 11/219,902

(22) Filed: Sep. 6, 2005

(65) Prior Publication Data
US 2006/0025552 A1    Feb. 2, 2006

Related U.S. Application Data

(63) Continuation of application No. PCT/EP2004/002212, filed on Mar. 4, 2004.

(30) Foreign Application Priority Data
Mar. 6, 2003    (DE) .................... 103 09 858

(51) Int. Cl.
C08F 24/00    (2006.01)
C08F 20/06    (2006.01)
C08F 118/02   (2006.01)
C08F 14/06    (2006.01)

(52) U.S. Cl. .................. 526/208; 526/266; 526/317.1; 526/319; 526/344

(58) Field of Classification Search ............... 526/208, 526/266, 317.1, 319, 344
See application file for complete search history.

(56) References Cited

U.S. PATENT DOCUMENTS

| | | | | |
|---|---|---|---|---|
| 2,609,355 | A | * | 9/1952 | Winkler ................. 524/109 |
| 2,835,643 | A | * | 5/1958 | Bauer et. al. ............ 528/487 |
| 3,259,597 | A | * | 7/1966 | Burger ................... 524/178 |
| 4,704,411 | A | * | 11/1987 | Gansow et al. ........... 521/166 |
| 4,707,411 | A | | 11/1987 | Nakayama et al. |
| 4,900,777 | A | | 2/1990 | Ball et al. |
| 4,985,314 | A | | 1/1991 | Merriam et al. |
| 5,391,664 | A | * | 2/1995 | Takei et al. ............. 526/210 |

FOREIGN PATENT DOCUMENTS

| | | |
|---|---|---|
| EP | 0 219 097 A2 | 4/1987 |
| EP | 0 264 916 A2 | 4/1988 |
| EP | 0 358 067 A2 | 3/1990 |
| EP | 0 760 379 | 8/1996 |
| EP | 0 989 162 A1 | 3/2000 |
| EP | 1 153 979 A2 | 11/2001 |
| JP | 45-038260 | 12/1970 |
| JP | 57-108140 | 7/1982 |
| JP | 60-238306 | 11/1985 |
| JP | 62-181319 | 8/1987 |
| JP | 03-086744 | 4/1991 |
| JP | 05-202255 | 8/1993 |
| JP | 07-278209 | 10/1995 |
| JP | 10-168104 | 6/1998 |
| JP | 10-182909 | 7/1998 |
| JP | 11-100485 | 4/1999 |
| JP | 11-140256 | 5/1999 |
| JP | 11-511195 | 9/1999 |
| JP | 2001-139698 | 5/2001 |

OTHER PUBLICATIONS

Derwent Abstract corresponding to EP 1 153 979 [An 2002-099044].
Derwent Abstract corresponding to EP 0 358 067 [An 1990-076827].
English Abstract corresponding to JP 11-100485.
English Abstract corresponding to JP 11-511195.
English Abstract corresponding to JP 11-140-256.
English Abstract corresponding to JP 10-168104.
English Abstract corresponding to JP 07-278209.
English Abstract corresponding to JP 03-086744.
English Abstract corresponding to JP 05-202255.
English Abstract corresponding to JP 45-038260.
English Abstract corresponding to JP 57-108140.
English Abstract corresponding to JP 10-182909.
English Abstract corresponding to JP 2001-139698.
English Abstract corresponding to JP 60-238306.
English Abstract corresponding to JP 62-181319.

* cited by examiner

Primary Examiner—William K Cheung
(74) Attorney, Agent, or Firm—Brooks Kushman P.C.

(57) ABSTRACT

A process for the preparation of vinyl chloride copolymers involves free radical suspension polymerization or emulsion polymerization of a mixture of vinyl chloride, epoxide-containing vinyl monomers and further comonomers copolymerizable therewith, wherein a) from 49.5 to 90% by weight of vinyl chloride,
b) from 0.01 to 0.7% by weight of epoxide-containing vinyl monomers and
c) from 9.5 to 50% by weight of further comonomers copolymerizable with a) and b) are polymerized, the data in % by weight totaling 100% by weight, and from 0.001 to 0.1% by weight of one or more aliphatic or alicyclic, saturated or unsaturated dicarboxylic acids having 1 to 10 carbon atoms, or aliphatic and alicyclic, saturated and unsaturated hydroxymono-, hydroxydi- and hydroxytricarboxylic acids having 3 to 10 carbon atoms and 1 to 4 hydroxyl groups are added during or after the polymerization, and the vinyl chloride copolymer is isolated as a solid resin.

19 Claims, No Drawings

THERMOSTABLE VINYLCHLORIDE MIXED POLYMERS

CROSS-REFERENCE TO RELATED APPLICATIONS

This application is a continuation of PCT/EP2004/002212, filed Mar. 4, 2004.

BACKGROUND OF THE INVENTION

1. Field of the Invention

The invention relates to a process for the preparation of thermally stable vinyl chloride copolymers, processes for the preparation thereof, and to the use thereof, in particular in coating resin compositions.

2. Background Art

A major problem with the use of vinyl chloride copolymers is the insufficient stability of solutions of these polymers in organic solvents, in particular in ketones. In warm regions having an ambient temperature of more than 30° C., a yellow or brown discoloration of the originally colorless solutions occurs after storage of such solutions for only a few days. Also problematic is the storage of pulverulent resins based on vinyl chloride copolymers at elevated temperatures. Here, discoloration of the powder may occur after a storage time of only a few months, subsequently leading to discoloration of solutions of these powders.

The lack of thermal stability of these copolymers is said to be a reason for the tendency of solutions of vinyl chloride copolymers to become discolored. Other adverse phenomena are corrosion phenomena in the form of rust formation on metal parts of machines and storage containers which come into contact with solutions of vinyl chloride copolymers.

EP-B 358067 proposes the use of vinyl chloride copolymers comprising from 1 to 20% by weight of glycidyl methacrylate and from 12 to 40% by weight of further comonomers for improving the resistance to yellowing. EP-B 219097 discloses that the thermal stability can be improved by copolymerizing vinyl chloride with OH-functional acrylates, epoxide-containing comonomers and acid-functional comonomers. For the epoxide-containing comonomers, such as glycidyl methacrylate, it is recommended to use these in an amount of from 1 to 12% by weight. Similar copolymers form the subject of EP-B 264196, in which a content of less than 0.5% by weight of epoxide groups, corresponding to about 1.7% by weight of glycidyl methacrylate, is described as being insufficient for improving the thermal stability.

SUMMARY OF THE INVENTION

Against this background, it was an object of the invention to provide thermally stable vinyl chloride copolymers. This and other objects are achieved through a process wherein vinyl chloride is copolymerized with a most minor amount of an epoxy-containing comonomer, and a yet smaller amount of an optionally hydroxyl-substituted saturated carboxylic acid.

DETAILED DESCRIPTION OF THE PREFERRED EMBODIMENT(S)

The invention relates to a process for the preparation of vinyl chloride copolymers by means of free radical suspension polymerization or emulsion polymerization of a mixture of vinyl chloride, epoxide-containing vinyl monomers and further comonomers copolymerizable therewith, characterized in that a) from 49.5 to 90% by weight of vinyl chloride,
b) from 0.01 to 0.7% by weight of epoxide-containing vinyl monomers and
c) from 9.5 to 50% by weight of further comonomers copolymerizable with a) and b) are polymerized, and from 0.001 to 0.1% by weight of one or more carboxylic acids from the group of aliphatic and alicyclic, saturated and unsaturated dicarboxylic acids having 1 to 10 carbon atoms and aliphatic and alicyclic, saturated and unsaturated hydroxymono-, hydroxydi- and hydroxytricarboxylic acids having 3 to 10 carbon atoms and 1 to 4 hydroxy groups are added during or after the polymerization, the percentages by weight totaling 100% by weight, and the vinyl chloride copolymer is isolated as a solid resin.

Suitable epoxide-containing vinyl monomers b) are, for example, methyl glycidyl methacrylate, methyl glycidyl acrylate, allyl glycidyl ether, allylphenol glycidyl ether and glycidyl methacrylate. Glycidyl methacrylate (GMA) is preferred. Preferably from 0.01 to 0.5% by weight, more preferably from 0.1 to 0.4% by weight, of epoxide-containing vinyl monomers are copolymerized.

Suitable copolymerizable comonomers c) are one or more ethylenically unsaturated monomers from the group consisting of vinyl esters of straight-chain or branched alkylcarboxylic acids having 1 to 18 carbon atoms, acrylates or methacrylates of branched or straight-chain alcohols or diols having 1 to 18 carbon atoms, and ethylenically unsaturated mono- and dicarboxylic acids and anhydrides thereof.

Preferred vinyl esters are those of carboxylic acids having 1 to 12 carbon atoms. Vinyl acetate, vinyl propionate, vinyl butyrate, vinyl 2-ethyhexanoate, vinyl laurate, 1-methylvinyl acetate, vinyl pivalate and vinyl esters of α-branched monocarboxylic acids having 9 to 13 carbon atoms, for example VeoVa9$^R$ or VeoVa10$^R$ (trade names of Shell) are preferred. Vinyl acetate is most preferred.

Preferred monomers from the group consisting of acrylates or methacrylates are esters of straight-chain or branched alcohols having 1 to 15 carbon atoms. Particularly preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are most preferred.

Examples of suitable ethylenically unsaturated mono- and dicarboxylic acids and anhydrides thereof are acrylic acid, methacrylic acid, fumaric acid, itaconic acid, crotonic acid, maleic acid and maleic anhydride.

The free radical polymerization can be effected by means of suspension polymerization and emulsion polymerization. The polymerization temperature is in general from 20° C. to 75° C. The initiation of the polymerization can be effected with the customary water-soluble or monomer-soluble initiators or redox initiator combinations. Examples of water-soluble initiators are the sodium, potassium and ammonium salts of peroxoydisulfuric acid. Examples of monomer-soluble initiators are dicetyl peroxydicarbonate, dicyclohexyl peroxydicarbonate, dibenzoyl peroxide and tert-butyl peroxypivalate. The initiators are used in general in an amount of from 0.01 to 1.0% by weight, preferably from 0.1 to 0.5% by weight, based in each case on the total weight of the monomers. In the case of solution polymerization, organic solvents, such as ethyl acetate, are used. In the case of the suspension and emulsion polymerization processes, polymerization is effected in water in the presence of surface-active substances such as protective colloids and/or emulsifiers. Suitable protective colloids are, for example, partly hydrolyzed polyvinyl alcohols. Suitable emulsifiers are anionic, cationic and nonionic emulsifiers, for example anionic surfactants such as alkylsulfates having a chain length of from 8 to 18 carbon atoms, alkane- or alkylarylsulfonates having from 8 to 18 carbon atoms, esters and monoesters of sulfosuccinic acid with monohydric alcohols or alkylphenols, or nonionic surfactants such as alkylpolyglycol ethers or alkylarylpolyglycol ethers having up to 60 ethylene oxide or propylene oxide units.

For controlling the molecular weight, regulating substances can be used during the polymerization. If regulators are used, these are usually used in amounts of from 0.02 to 10.0% by weight, based on the monomers to be polymerized, and are metered separately or in a form premixed with reaction components. Examples of such substances are halogenated alkanes and halogenated alkenes such as carbon tetrachloride, chloroform, methyl chloride and trichloroethylene, and aldehydes such as acetaldehyde, propionaldehyde, butyraldehyde and isobutyraldehyde.

Polymerization is preferably effected in the presence of propionaldehyde. Compared with other regulators such as trichloroethylene, propionaldehyde has the advantage that a regulating effect is achieved even with small amounts. Propionaldehyde is therefore preferably added in an amount of from 0.02 to 5% by weight, based on the monomer, depending on the desired molecular weight. A disadvantage of the use of propionaldehyde was that colored products are obtained therewith. Surprisingly, it was found that, in the procedure according to the invention, no discoloration occurs in the presence of epoxide-containing vinyl monomers and (iso) ascorbic acid.

The monomers can be metered in together or can be initially introduced in portions and the remainder can be metered in after initiation of the polymerization. The meterings can be carried out separately (with respect to space and time), or some or all of the components to be metered can be metered in preemulsified form. In a preferred embodiment, the epoxide-containing vinyl monomers are metered in together and batchwise or more preferably, together and continuously.

After the end of the polymerization, postpolymerization can be effected for removing residual monomers using known methods, for example by postpolymerization initiated by a redox catalyst. Volatile residual monomers can also be removed by means of distillation, preferably under reduced pressure, and optionally by passing inert entraining gases such as air, nitrogen or steam, through or over the reaction mixture.

From 0.001 to 0.1% by weight of one or more carboxylic acids from the group of aliphatic and alicyclic, saturated and unsaturated dicarboxylic acids having 1 to 10 carbon atoms and aliphatic and alicyclic, saturated and unsaturated hydroxymono-, hydroxydi- and hydroxytricarboxylic acids having 3 to 10 carbon atoms and 1 to 4 hydroxyl groups is added during or after the polymerization. The addition is preferably effected after the end of the monomer metering and before, during, or after the removal of residual monomers. Examples of dicarboxylic acids are oxalic acid, malonic acid, succinic acid, glutaric acid, adipic acid and maleic acid and fumaric acid. The hydroxycarboxylic acids are particularly preferred, for example tartronic acid, malic acid, tartaric acid, citric acid, isocitric acid, ascorbic acid and isoascorbic acid.

Ascorbic acid and isoascorbic acid are most preferred, in particular combinations of ascorbic acid or isoascorbic acid with citric acid. The amount of (iso)ascorbic acid and citric acid is preferably in each case from 0.005 to 0.05% by weight, based in each case on the total weight of the comonomers.

The vinyl chloride copolymer obtained by this process can be isolated by customary methods, by precipitation, filtration and subsequent drying.

The vinyl chloride copolymers are suitable, for example, as binders for coatings, in particular in heat-seal coatings, for example for aluminum coating.

The following examples serve for further explanation of the invention:

EXAMPLE 1

A copolymer comprising 83.8% by weight of vinyl chloride, 14.8% by weight of vinyl acetate, 1.0% by weight of fumaric acid, and 0.4% by weight of glycidyl methacrylate was prepared by the suspension polymerization process, 0.05% by weight of ascorbic acid and 0.0075% by weight of citric acid, based in each case on the total weight of the comonomers and in each case as a 10% strength aqueous solution, being added to the batch at the end of the comonomer metering. Immediately after this addition, the batch was let down to atmospheric pressure. Thereafter, demonomerization was effected, the batch was neutralized by adding 0.5% by weight of sodium hydroxide solution and the copolymer was filtered, washed and dried.

For testing the thermal stability, a 20% strength by weight solution of the copolymer in methyl ethyl ketone was prepared and was stored at 60° C., and the discoloration of the solution was monitored as a function of time. The solution remained completely colorless even after a storage time of one week.

EXAMPLE 2

Analogously to the procedure of example 1, a copolymer was prepared from 83.8% by weight of vinyl chloride, 14.8% by weight of vinyl acetate, 1% by weight of fumaric acid, and 0.4% by weight of glycidyl methacrylate. A 20% strength by weight solution of the copolymer in methyl ethyl ketone showed only a slight discoloration after a storage time of six days at 60° C.

EXAMPLE 3

A copolymer of 83.8% by weight of vinyl chloride, 14.8% by weight of vinyl acetate, 1% by weight fumaric acid and 0.4% by weight of glycidyl methacrylate was prepared by the procedure in example 1, with the only difference that only 0.05% by weight of ascorbic acid (no citric acid) was added. A 20% strength by weight solution of the copolymer in methyl ethyl ketone showed only a very slight discoloration even after a storage time of one week at 60° C.

EXAMPLE 4

A copolymer was prepared from 84.8% by weight of vinyl chloride, 14.8% by weight of vinyl acetate and 0.4% by weight of glycidyl methacrylate by the emulsion polymerization process. At the end of the reaction, the mixture was let down to atmospheric pressure and 0.02% by weight of ascorbic acid and 0.0025% by weight of citric acid, based in each case on the total weight of the comonomers and in each case as a 10% strength aqueous solution, were added to the batch.

Thereafter, demonomerization was effected and the copolymer was precipitated, filtered, washed and dried. A 20% strength by weight solution of the copolymer in methyl ethyl ketone remained completely colorless even after a storage time of one week at 60° C.

COMPARATIVE EXAMPLE A

A copolymer was prepared from 85% by weight of vinyl chloride and 15% by weight of vinyl acetate by means of emulsion polymerization analogously to example 4. A 20% strength by weight solution of the copolymer in methyl ethyl ketone showed a slight discoloration even at room temperature. After storage for 1 day at 60° C., a substantial brown coloration was found.

EXAMPLE 5

The procedure was analogous to example 4, with the difference that polymerization was effected in the presence of 2% by weight of propionaldehyde, based on total monomer. A 20% strength by weight solution of the copolymer in methyl ethyl ketone showed a lower solution viscosity than the product from example 4 and remained completely colorless even after a storage time of one week at 60° C.

EXAMPLE 6

The procedure was analogous to example 5, with the difference that polymerization was effected in the presence of 4% by weight of trichloroethylene, based on total monomer. A 20% strength by weight solution of the copolymer in methyl ethyl ketone showed a similar solution viscosity to the product from example 5 and remained completely colorless even after a storage time of one week at 60° C.

COMPARATIVE EXAMPLE B

A copolymer was prepared from 85% by weight of vinyl chloride and 15% by weight of vinyl acetate in the presence of 2% by weight of propionaldehyde, based on total monomer, by means of emulsion polymerization analogously to comparative example A. A 20% strength by weight solution of the copolymer in methyl ethyl ketone showed a lower solution viscosity than a solution of the product from comparative example A, and a slight discoloration even at room temperature.

The comparison of example 3 with example 2 shows that a thermally stable product is obtained with substantially smaller amounts of GMA than in the prior art on stopping the reaction with ascorbic acid, owing to the synergistic interaction of GMA and ascorbic acid. Example 1 shows that this synergistic effect can be even further increased with citric acid. The comparison of examples 5 and 6 and comparative example B shows the advantageous regulating effect of propionaldehyde without discoloration of the product occurring.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of vinyl chloride copolymers resistant to coloration upon storage, comprising copolymerizing:
   a) from 49.5 to 90 weight percent vinyl chloride,
   b) from 0.01 to 0.4 weight percent of one or more epoxy group-containing vinyl monomers, and
   c) from 9.5 to 50 weight percent of copolymerizable monomers other than those of a) and b), and
   d) isolating a solid polyvinyl resin copolymer,
   wherein during or following the polymerization, but prior to isolating the solid polyvinyl resin copolymer from 0.001 to 0.1 weight percent of one or more carboxylic acids are added, said carboxylic acids selected from the group consisting of saturated mono- and dicarboxylic acids having from 2 to 10 carbon atoms and saturated and unsaturated hydroxy-substituted carboxylic acids having 3 to 10 carbon atoms, 1 to 4 hydroxyl groups, and 1 to 3 carboxylic acid groups.

2. The process of claim 1, wherein said carboxylic acid is a saturated dicarboxylic acid.

3. The process of claim 1, wherein said carboxylic acid is a hydroxy-substituted carboxylic acid.

4. The process of claim 1, wherein at least one carboxylic acid is selected from the group consisting of ascorbic acid, isoascorbic acid, and citric acid.

5. The process of claim 1, wherein said carboxylic acid is a mixture of ascorbic acid and/or isoascorbic acid with citric acid.

6. The process of claim 1, wherein said copolymerizing takes place in the presence of propionaldehyde.

7. The process of claim 5, wherein said copolymerizing takes place in the presence of propionaldehyde.

8. The process of claim 1, wherein at least one comonomer c) is selected from the group consisting of vinyl acetate, vinyl propionate, vinyl butyrate, vinyl-2-ethylhexanoate, vinyl laurate, 1-methyl vinyl acetate, vinyl pivalate and vinyl esters of α-branched monocarboxylic acids having 9 to 13 carbon atoms, optionally in combination with one or more comonomers selected from the group consisting of acrylic acid, methacrylic acid, fumaric acid, itaconic acid, crotonic acid, maleic acid and maleic anhydride 9. The process of claim 1, wherein at least one epoxy group-containing comonomer b) is selected from the group consisting of methyl glycidyl methacrylate, methyl glycidyl acrylate, allyl glycidyl ether, allylphenol glycidyl ether and glycidyl methacrylate.

10. A coating composition containing, as a binder, a product of the process of claim 1.

11. A heat-seal coating, comprising a substrate, and coated on said substrate, a product of the process of claim 1.

12. The process of claim 1, wherein said carboxylic acid(s) are added following said copolymerizing but prior to isolating said solid product.

13. The process of claim 4, wherein said carboxylic acid(s) are added following said copolymerizing but prior to isolating said solid product.

14. The process of claim 5, wherein said carboxylic acid(s) are added following said copolymerizing but prior to isolating said solid product.

15. The process of claim 6, wherein said carboxylic acid(s) are added following said copolymerizing but prior to isolating said solid product.

16. A process for the preparation of vinyl chloride copolymers resistant to coloration upon storage, comprising copolymerizing:
   a) from 49.5 to 90 weight percent vinyl chloride,
   b) from 0.01 to 0.4 weight percent of one or more epoxy group-containing vinyl monomers, and
   c) from 9.5 to 50 weight percent of copolymerizable monomers other than those of a) and b), and
   d) isolating a solid polyvinyl resin copolymer, wherein following the polymerization, but prior to isolating the solid polyvinyl resin copolymer, from 0.001 to 0.1 weight percent of one or more carboxylic acids are added, said carboxylic acids selected from the group consisting of saturated and unsaturated dicarboxylic acids having from 2 to 10 carbon atoms and aliphatic and alicyclic hydroxy-substituted carboxylic acids having 3 to 10 carbon atoms, 1 to 4 hydroxyl groups, and 1 to 3 carboxylic acid groups.

17. The copolymer of claim 1, wherein the polymer is prepared by copolymerizing vinyl chloride, vinyl acetate, and from 0.01 to 0.4 weight percent of an epoxy group-containing vinyl monomer.

18. The copolymer of claim 16, wherein said carboxylic acid is selected from the group consisting of oxalic acid, malonic acid, succinic acid, glutaric acid, adipic acid, maleic acid, fumaric acid, tartronic acid, malic acid, tartaric acid, citric acid, isocitric acid, ascorbic acid, isoascorbic acid, and mixtures thereof.

19. The process of claim 1, wherein the polymerization is a solution polymerization in organic solvent, or a suspension or emulsion polymerization in water.

* * * * *

UNITED STATES PATENT AND TRADEMARK OFFICE
CERTIFICATE OF CORRECTION

PATENT NO. : 7,655,741 B2  
APPLICATION NO. : 11/219902  
DATED : February 2, 2010  
INVENTOR(S) : Kaiser et al.

It is certified that error appears in the above-identified patent and that said Letters Patent is hereby corrected as shown below:

Title Page, Should read item [73], after Wacker Chemie AG, Munich (DE)

Insert -- Vinnolit GmbH, Ismaning (DE) --

Signed and Sealed this

Twenty-second Day of June, 2010

David J. Kappos  
*Director of the United States Patent and Trademark Office*

UNITED STATES PATENT AND TRADEMARK OFFICE
CERTIFICATE OF CORRECTION

PATENT NO. : 7,655,741 B2
APPLICATION NO. : 11/219902
DATED : February 2, 2010
INVENTOR(S) : Kaiser et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this

Twenty-eighth Day of December, 2010

David J. Kappos
*Director of the United States Patent and Trademark Office*